United States Patent [19]
Youden

[11] 3,708,923
[45] Jan. 9, 1973

[54] MACHINE TOOL
[75] Inventor: David H. Youden, Worcester, Mass.
[73] Assignee: The Heald Machine Company, Worcester, Mass.
[22] Filed: May 22, 1970
[21] Appl. No.: 39,620

[52] U.S. Cl. .................................... 51/165.93, 308/5
[51] Int. Cl. ............................................ B24b 41/02
[58] Field of Search ........ 51/165, 165.93, 166; 308/5

[56] References Cited

UNITED STATES PATENTS

| | | |
|---|---|---|
| 2,612,008 | 9/1952 | Kuniholm .......................... 51/165.93 |
| 3,466,951 | 9/1969 | Greenberg ............................... 77/1 |
| 3,197,921 | 8/1965 | Hohler .............................. 51/165.93 |
| 3,418,025 | 12/1968 | Hucks ..................................... 308/5 |
| 1,207,535 | 12/1916 | Gardner .................................. 51/166 |

Primary Examiner—Harold D. Whitehead
Attorney—Norman S. Blodgett

[57] ABSTRACT

This invention relates to a machine tool and, more particularly, to apparatus making use of hydrostatic bearings in the guide ways.

7 Claims, 6 Drawing Figures

MACHINE TOOL

BACKGROUND OF THE INVENTION

It has become common practice to use hydrostatic bearings to provide for the sliding motion between the elements of machine tools. One of the advantages of this type of bearing is that it provides a "stiff" suspension; that is, it connects the machine tool elements with a minimum of deflection under load. These prior art machine tools, however, have suffered from a number of deficiencies. For one thing, because of the long metal path between the workpiece and the tool, the heating and cooling of the machine produces substantial changes in their geometric relationship which, when the machine is set up for a long run of pieces, can produce substantial changes in size, taper, and quality of finished workpiece surface from one part of the run to another. Furthermore, when it is desired to make extremely small changes in the relative positions of the tool and workpiece, this can only be accomplished with difficulty and by means of such elements as screws which are subject to backlash, stretching, and other error-introducing elements. These and other difficulties experienced with the prior art devices have been obviated in a novel manner by the present invention.

It is, therefore, an outstanding object of the invention to provide a machine tool permitting the adjustment of table height and horizontal position at right angles to the ways in increments as small as 0.000005 inches within a range of ±0.0002 inches.

Another object of this invention is the provision of a machine tool in which the element carrying the tool is located directly from the element carrying the workpiece to provide a minimum thermal loop.

A further object of the present invention is the provision of a machine tool using a table sliding under a bridge in which the bridge lateral stiffness is substantially increased over present bridge construction.

It is another object of the instant invention to provide a machine tool having precision ways in which machining and assembly times can be reduced over those required for conventional way systems and in which static and dynamic system response can be improved.

A still further object of the invention is the provision of a machine tool in which the distance between workpiece and tool is substantially maintained constant despite thermal changes.

With these and other objects in view, as will be apparent to those skilled in the art, the invention resides in the combination of parts set forth in the specification and covered by the claims appended hereto.

SUMMARY OF THE INVENTION

In general, the invention consists of a machine tool having a base on which is mounted a table for movement in the first direction. A bridge is also attached to the base and extends transversely of the first direction over the table. A first hydrostatic bearing exists between the base and the under side of the table and a second hydrostatic bearing exists between the bridge and the upper side of the table.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
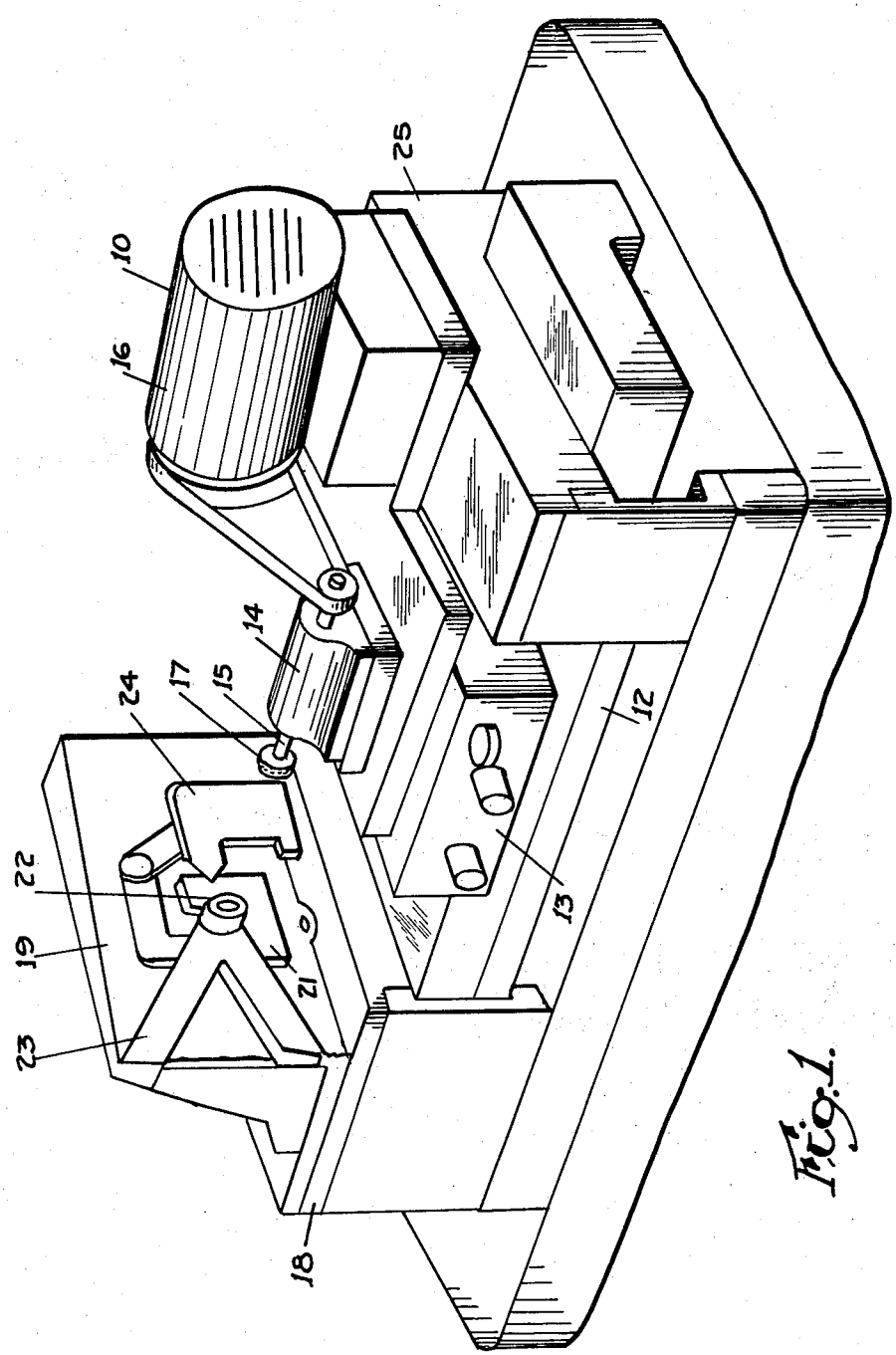
FIG. 1 is a perspective view of the machine tool embodying the principles of the present invention.

Referring first to FIG. 1, wherein are best shown the general features of the invention, it can be seen that the machine tool, indicated generally by the reference numeral 10, is shown for the purpose of description as a grinding machine. It is provided with a base 11 on which is mounted a table 12. The base is of a generally rectangular shape in plan view and the table is mounted to move longitudinally thereover. Mounted on the table is a cross slide 13 carrying a wheelhead 14 having a spindle 15 driven by a motor 16. The spindle 15 extends in the direction of motion of the table 12 (that is to say, longitudinally of the base 11) and carries on its outer end a tool such as an abrasive wheel 17. Also attached to the base is a bridge 18 on the top of which is carried a workhead 19 having a support 21 on which is rotatably carried a workpiece 22. Also mounted on the workhead 19 is a chute 23 for introducing workpieces to the work area. A dressing apparatus 24 is carried on the workhead.

The machine tool is provided in the usual way with means, such as a hydraulic cylinder (not shown), for moving the table 12 longitudinally and also with a feed mechanism enclosed in the slide 13 (also not shown) for producing lateral movement of the abrasive wheel 17 transversely of the spindle axis. These controls and motion-producing equipment are well-known and it is not felt necessary to show their details in the present application.

It is also interesting to note that, at the outer end of the base 11, is provided a second bridge 25, so that the table 12 slides back and forth under the two bridges. The limit of motion of the table, of course, is the point of engagement of the cross slide 13 with the bridge 18 on one end of its motion and the bridge 25 at the other end.

Figure 2:
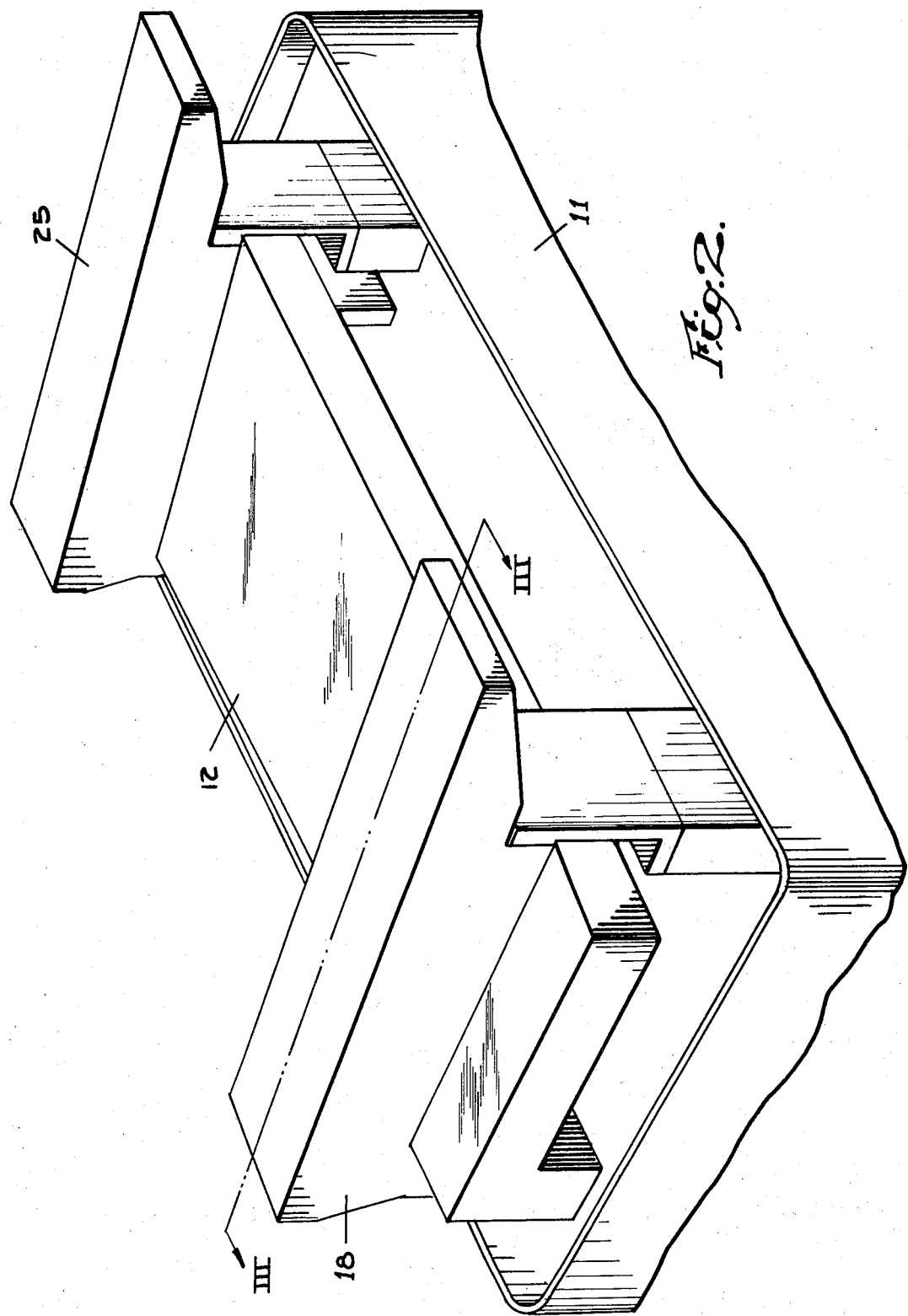
FIG. 2 is a perspective view of the machine with workholding and tool elements removed.

FIG. 2 shows rather well the general arrangement of the base 11, the table 12, and the bridges 18 and 25 and gives a suggestion of the way in which these basic elements could be applied to many types of machine tools other than grinding machines.

Figure 3:
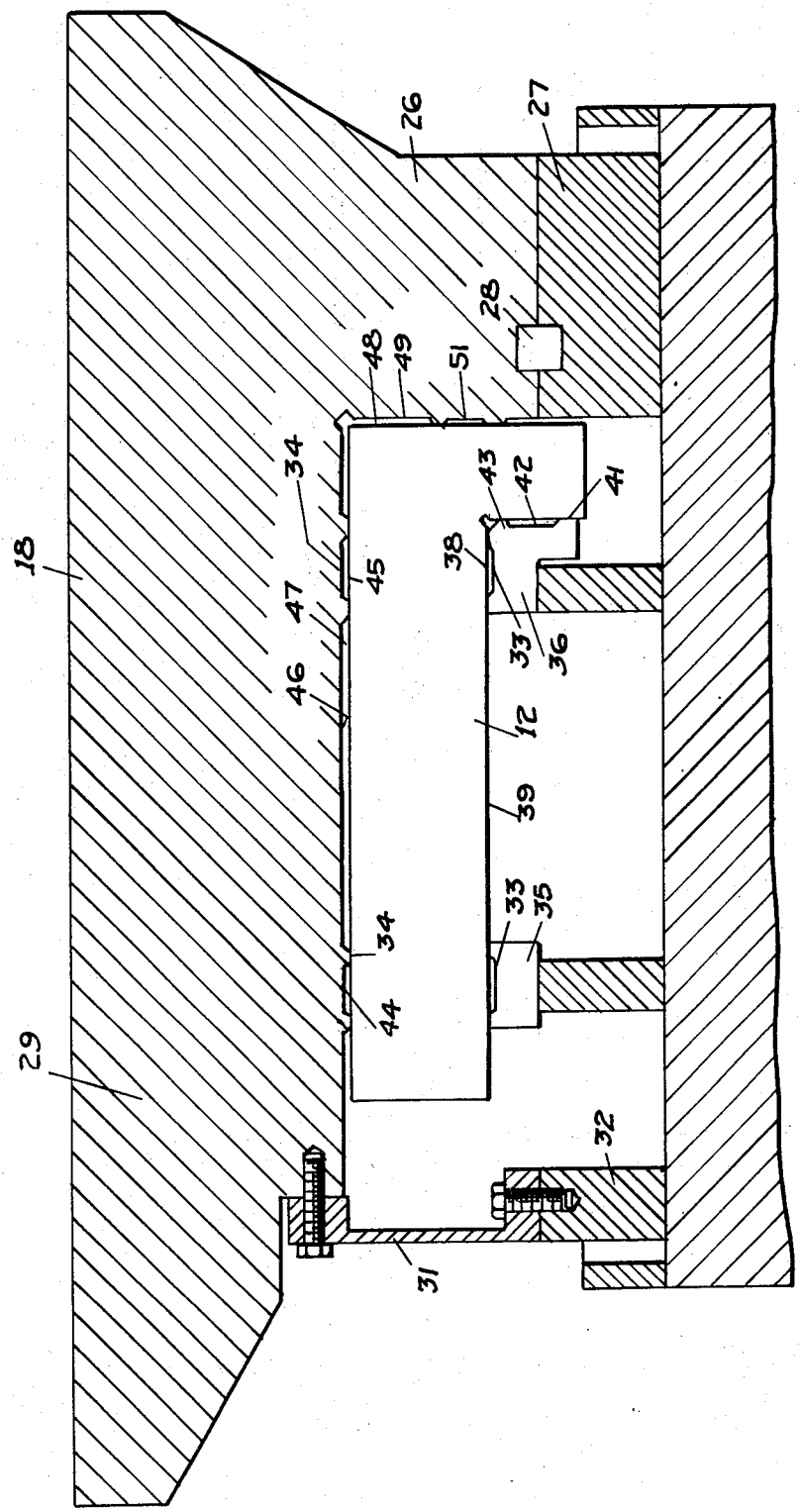
FIG. 3 is a sectional view of the machine taken on the line III—III of FIG. 2.

Referring now to FIG. 3, it can be seen that the bridge 18 is L-shaped and has a vertical leg 26 which is bolted to an abutment 27 of the base 11. A key 28 locks the bridge and the base together against transverse motion. From the upper end of the vertical leg 26 extends a horizontal leg 29 which overlies the table 12 and has at its free end (the end opposite the leg 26) a connecting element 31 which is substantially weaker in bending than the leg 26. The lower end of the element 31 is connected to a suitable abutment 32 of the base.

A first hydrostatic bearing 33 lies between the base 11 and the underside of the table 12, while a second hydrostatic bearing 34 exists between the bottom of the leg 29 of the bridge and the upper side of the table 12.

Extending upwardly from the base 11 are abutments 35 and 36 provided, respectively, with pockets 37 and 38 which lie opposite a horizontal plane surface 39 constituting the underside of the table 12. In addition, the abutment 36 is provided with a vertical surface 41 having a pocket 42 which cooperates with a facing vertical surface 43 on the table 12 to form a hydrostatic bearing. The pockets 37 and 38 are spaced laterally of the direction of movement of the table 12 and, of course, cooperate with the surface 39 of the table to form a first hydrostatic bearing. A second hydrostatic bearing 34 consists of a pair of transversely-spaced pockets 44 and 45 formed on a horizontal plane surface 46 forming the undersurface of the leg 29 of the bridge 18. The table 12 is provided with a horizontal plane surface 47 which cooperates with the pockets 44 and 45 to form the second hydrostatic bearing 34. The table 12 is provided with a vertical plane surface 48 which lies adjacent a vertical plane surface 49 formed on the inner side of the leg 26 of the bridge 18. The surface 49 is provided with a hydrostatic pocket 51 which cooperates with the plane surface 48 to form a hydrostatic bearing.

The second bridge 25 is, of course, spaced from and parallel to the bridge 18, but is provided with hydrostatic bearings and pockets similar to those shown in FIG. 3. Similarly, the table 12 is supported on hydrostatic bearings extending both vertically and horizontally under the bridge 25 in the manner shown in FIG. 3 in connection with the bridge 18. A source of pressure fluid is attached to all of the hydrostatic bearings and means is provided, as will be described hereinafter, to adjust the fluid pressure to produce relative adjustment of the distance between the table 12 and the bridges 18 and 25.

Figure 4:
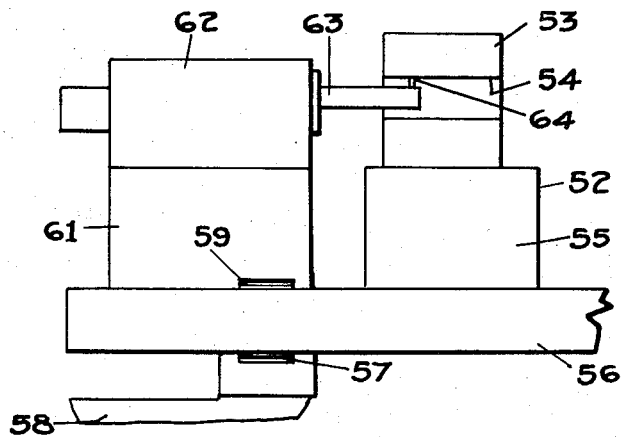
FIG. 4 is a schematic view of a modified form of the invention.

FIG. 4 shows the way in which the principles of the invention can be applied to a boring machine 52. The workpiece 53 is to be provided with a bore 54 and, for that purpose, is mounted on a fixture 55 which, in turn, is mounted on the table 56. The hydrostatic bearing 57 exists between the underside of the table 56 and the base 58, while a hydrostatic bearing 59 exists between the upper surface of the table 56 and a bridge 61. At the top of the bridge is mounted a head 62 rotatably carrying a spindle 63, the outer end of which is provided with a single point boring tool 64. An interesting thing to note in connection with this figure of the drawings is that, even when the table 56 is fed to the left to move the tool 64 through the bore 54, the distance between the end of the spindle 63 carrying the tool 64 and the bearing 57 and 59 remains the same. Therefore, the couple present at the bearings 57 and 59 due to the working remains the same during the operation and bending of the table 56 and other elements is reduced.

Figure 5:
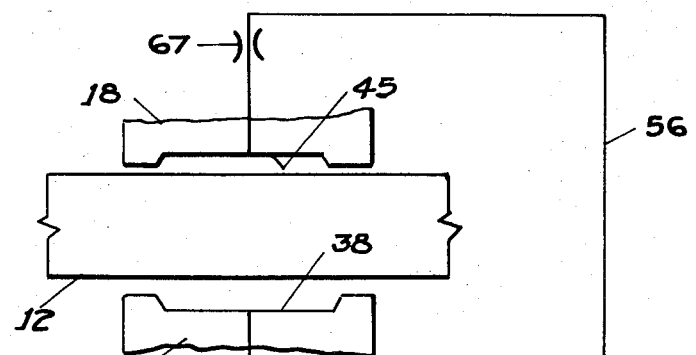
FIG. 5 is a hydraulic schematic view of control elements associated with the machine.

FIG. 5 shows one way of adjusting the hydrostatic pressure to the hydrostatic bearings 34 between the bridge and the table. The source of pressure fluid 65 is connected by a conduit 66 through a restrictor 67 to the pocket 45 formed on the undersurface 46 of the bridge 18. The source 65 is also connected through a variable pressure regulating valve 68 to the pocket 38 on the upper surface of the base 11. By changing the pressure allowed to pass to the pocket 38 by means of the valve 68, it is possible to move the table 12 toward and away from the bridge 18. This is done simply by operating an adjusting knob on the face of the valve 68.

Figure 6:
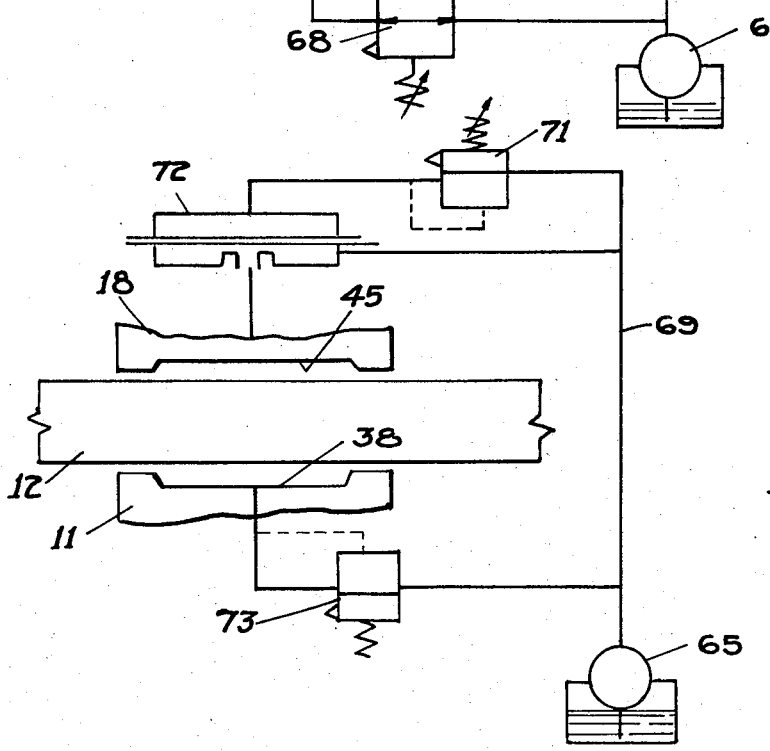
FIG. 6 is a schematic view of a modified hydraulic circuit used with the machine.

FIG. 6 shows an alternative method of controlling the pressures to the hydrostatic bearings. The source 65 of pressure fluid introduces fixed pressure fluid into a conduit 69 which is connected through a pressure regulating valve 71 and through a diaphragm valve 72 to the pocket 45 on the bridge. The diaphragm valve 12 is similar to the one shown and described in the patent application of Youden, Ser. No. 805,580, filed Mar. 5, 1969. The function is to attempt to maintain the bearing gap at the pocket 45 at a constant value despite changes in load, thus producing a stiff bearing. The source 65 is also connected through a pressure regulating valve 73 to the pocket 38 in the base 11. An adjustment of the regulating valve 71 can increase and decrease the pressure in the pocket 38 and cause the table 12 to be moved in very small increments toward and away from the bridge 18. This, in turn, adjusts the distance between the workpiece 22 and the tool 17. Similar pressure adjusting apparatus can be used in connection with the pockets 42 and 51 for adjusting the table 12 horizontally relative to the bridge 18 to bring about horizontal adjustment between the workpiece and the tool.

It can be seen from examination of the drawings and a reading of the description that the active, guiding surfaces of the system of the invention are located on the outside of the table or moving elements. They are located by hydrostatic bearings situated in recesses in the bridges which span the table at each end. Beneath the table are four short blocks containing pre-loading pockets which force the table up against the oil film formed by the active pockets. This novel arrangement does not require that the ways be machined and then attached to the base, since the locating surfaces are machined on the table and positioned relative to the bridges which carry the workpiece or cutting tools, depending on the type of machine tool involved. The short, pre-loading blocks located beneath the table do not control the path of the table. These blocks only contribute a constant upward and sideways force to compensate for the weight of the table and of the tooling and to urge the table against the active bearings which do determine its position. The active pockets are located in the bridge where they are stationary with respect to the cutting loads (as shown in FIG. 4), and where they cause the table to follow changes in the bridge height due to heat and load. The only parts between the bearings and the boring head spindle are the bridge and the boring head body; this means that the thermal loop between the workpiece and the tool is substantially shorter than is possible with conventional designs. The bridges are keyed and bolted to the base so that growth in a horizontal plane occurs from a point only one or two inches from the table guide surface. This minimizes thermal drift in the horizontal plane at right angles to the table motion.

The method of the present invention of supporting the bridge on one very rigid leg and on one reed (bendable connecting element 31) makes the bridge up to four times stiffer in horizontal plane than is true in conventional apparatus.

The design of the present machine tool is based on the premise that it is relatively easy to machine an accurate right angle and also to produce two parallel surfaces to precision tolerances provided that the surfaces are accessible to the cutting tools. Because of this, the critical parts of the present system are either L-shaped or rectangular. The bridge is an L-shaped element, so that the guiding surface is parallel to the top and square with the adjacent guide surface. The table is L-shaped and machined so that the outside surfaces are square. Commercial tolerances are sufficient for the pre-load blocks. The machining required on the base or the sub-base is substantially reduced when the present type of table support is used, since there are no vertical surfaces required and, therefore, no angular or side wheel grinding is necessary. There are no ways to be manufactured and no hold-downs or gibs necessary for the present system. Hydrostatic bearings and restrictors, of course, must be manufactured, but these parts are smaller and, for the most part, less critical than the present types of ways and hold-downs.

The use of rectangular guide surfaces, as contrasted with V-type ways of the prior art, allows the system to be designed with the facility for micro-adjustment in the two planes perpendicular to the table travel. That is to say, the table may be raised, lowered, or moved from side to side within a range which is typically plus or minus 0.0002 inches. This movement may be made in increments as small as 5 microinches. Possible applications of this movement would be to adjust center-line heights, finish size holes, compensate for diamond wear, or to allow holes to be bored with extremely accurate center-line spacings. This small movement can be obtained either by adjusting the pre-load pocket pressures or by altering the diaphragm bias pressure on diaphragm-compensated bearings. These two systems are shown in FIGS. 5 and 6, respectively.

Another advantage of the present system is that the guiding surfaces of the table are on the outside where they are accessible for mounting other machine parts or accessories. The tooling or the cross-slide of a boring machine or the cross-slide of a grinding machine can be located square with the table travel to a high degree of accuracy without the need for scraped surfaces or the like. The present system offers the advantages of a stiffer bridge construction and decreased sensitivity to thermal drift. Furthermore, there is almost infinite stiffness and zero wear inherent in a diaphragm-compensated hydrostatic way system.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising
   a. a base,
   b. a table mounted on the base for movement in a first direction,
   c. a bridge attached to the base and extending transversely of the first direction over the table,
   d. a first hydrostatic bearing between the base and the underside of the table, and
   e. a second hydrostatic bearing between the bridge and the upper side of the table, the bridge being generally L-shaped and having a first leg that is fastened to the base and extends vertically at one side of the table and a second leg that extends horizontally from the upper end of the first leg over the table, the end of the second leg opposite the end which is connected to the first leg being connected to the base on the other side of the table by a connecting element which is relatively weaker in bending than the said first leg to compensate for thermal expansion and contraction of the bridge.

2. A machine tool as recited in claim 1, wherein the first hydrostatic bearing consists of a pair of pockets formed on the base and spaced transversely of the first direction.

3. A machine tool as recited in claim 2, wherein the first hydrostatic bearing also consists of a second pair of transversely-spaced pockets formed on the base, the second pair of pockets being spaced longitudinally in the first direction from the first-named pair.

4. A machine tool as recited in claim 1, wherein the second hydrostatic bearing consists of a pair of transversely-spaced pockets formed on the underside of the bridge.

5. A machine tool as recited in claim 4, wherein a second bridge is provided spaced from and parallel to the first-names bridge, the second bridge also being provided with a pair of transversely-spaced pockets forming a hydrostatic bearing with the upper surface of the table.

6. A machine tool as recited in claim 1, wherein the said first leg of each bridge has a vertical plane surface extending in the said first direction and facing a similar vertical plane surface of the table, and wherein a pocket is formed on the said vertical plane surface of the leg to form a hydrostatic bearing with the said vertical plane surface of the table.

7. A machine tool, comprising
   a. a base,
   b. a bridge attached to the base and extending transversely thereof and having a downwardly-directed surface.
   c. A table mounted on the bridge for movement longitudinally of the base and having an upwardly-directed surface which lies in closely-spaced relationship to the said surface of the bridge,
   d. a constant pressure hydraulic bearing lying between the base and the underside of the table to press the table upwardly against the said surface of the bridge, and
   e. a hydraulic hydrostatic bearing lying between the said surfaces of the bridge and the table and having a restrictor in a hydraulic line leading to the bearing.

* * * * *